US007942398B1

(12) United States Patent
Marcinik

(10) Patent No.: US 7,942,398 B1
(45) Date of Patent: May 17, 2011

(54) BUFFERING APPARATUS FOR COLLATIONS

(75) Inventor: Robert F. Marcinik, Wallkill, NY (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 12/632,592

(22) Filed: Dec. 7, 2009

(51) Int. Cl.
*B65G 15/14* (2006.01)

(52) U.S. Cl. ................ 270/58.01; 198/626.5; 414/790.3

(58) Field of Classification Search ............... 270/58.01; 414/789.9, 490.2, 790.3; 198/626.5
See application file for complete search history.

(56) References Cited

U.S. PATENT DOCUMENTS 4,502,592 A * 3/1985 Ramcke ..................... 198/626.5
4,641,742 A * 2/1987 Igarashi et al. ............ 198/626.5
4,925,180 A * 5/1990 Golicz .......................... 271/198
5,000,657 A * 3/1991 Gunther, Jr. ............... 414/790.3
5,692,745 A * 12/1997 Neifert et al. ................. 271/198
5,775,689 A * 7/1998 Moser et al. .................. 271/198
6,293,544 B1 * 9/2001 Fedinatz ....................... 271/243
7,588,239 B2 * 9/2009 Marcinik et al. ........... 270/52.18

* cited by examiner

*Primary Examiner* — Patrick Mackey
(74) *Attorney, Agent, or Firm* — Michael J. Cummings; Charles R. Malandra, Jr.

(57) ABSTRACT

A document handling apparatus includes a document transport buffering apparatus including drive belts and aligner belts. Each of the drive belts has a general continuous loop shape. The aligner belts are intermixed with the drive belts. Each of the aligner belts has a general continuous loop shape and a projection extending in a general cantilever fashion from the aligner belt. A first drive system is adapted to rotate the drive belts. A second drive system is adapted to rotate the aligner belts individually. The first and second drive systems are adapted to rotate the drive belts and the aligner belts such that a plurality of spaced stacks of documents are transported by the drive belts with one of the projections at a leading edge of each of the stacks and another one of the projections at a trailing edge of each of the stacks.

20 Claims, 12 Drawing Sheets

BUFFERING APPARATUS FOR COLLATIONS

BACKGROUND OF THE INVENTION

1. Field of the Invention

The invention relates to an apparatus for transporting documents and, more particularly, to an apparatus for buffering transport of documents between a document input at a first rate and a document output at a second different rate.

2. Brief Description of Prior Developments

In some document handling systems, such as an inserter, for example, used for inserting documents into envelopes, buffering of collations is an essential process in order to achieve optimum system throughput. In many cases the buffer machine utilizes rollers, clutches, and brakes. Such machines are limited to small collation sizes (such as less than 15 documents, for example, in a stack or collation), and also tend to introduce skew in the documents of a stack. Operators often adjust nip pressure and introduce straps and side guides to correct for this problem.

In addition, these machines often drive the collation with one axis and spring load the other axis in order to create a driving nip. This introduces undesired "shingling" to the collation, and this problem becomes worse for larger height collations or stacks.

SUMMARY

The following summary is merely intended to be exemplary. The summary is not intended to limit the scope of the claimed invention.

In accordance with one aspect of the invention, a document handling apparatus comprising a document transport buffering apparatus is provided. The document transport buffering apparatus comprises an array of drive belts, an array of aligner belts, a first drive system adapted to rotate the drive belts, and a second drive system adapted to rotate the aligner belts. Each of the drive belts has a general continuous loop shape. The aligner belts are intermixed with the drive belts, wherein each of the aligner belts has a general continuous loop shape and a projection extending in a general cantilever fashion from the aligner belt. The second drive system is adapted to rotate at least some of the aligner belts separately relative to each other. The first and second drive systems are adapted to rotate the drive belts and the aligner belts such that a plurality of spaced stacks of documents are transported by the drive belts with one of the projections at a leading edge of each of the stacks and another one of the projections at a trailing edge of each of the stacks.

In accordance with another aspect of the invention, a method is provided comprising transporting a first stack of documents by a drive belt; locating a first projection against a leading edge of the first stack, wherein the first projection is located on a first aligner belt adapted to rotate generally parallel to rotation of the drive belt; locating a second projection against a trailing edge of the first stack, wherein the second projection is located on a second aligner belt adapted to rotate generally parallel to rotation of the drive belt; and transporting a second stack of documents by the drive belt spaced from the first stack, wherein a leading edge of the second stack is located against the second projection.

In accordance with another aspect of the invention, a method of manufacturing a buffering apparatus is provided comprising providing an array of drive belts adapted to transport a plurality of stacks of documents; locating an array of aligner belts intermixed with the array of drive belts to rotate generally parallel to each other, wherein each of the aligner belts comprise a projection extending from the aligner belt in a general cantilever fashion; and connecting the aligner belts to a plurality of motors, wherein the motors are adapted to independently rotate at least some of the aligner belts relative to each other and relative to the drive belts, wherein the projections are located to project in an area against leading edges and trailing edges of the stacks to keep the stacks substantially straight during transport by the drive belts.

In accordance with another aspect of the invention, a program storage device readable by a machine, tangibly embodying a program of instructions executable by the machine for performing operations is provided comprising controlling a drive belt motor to rotate a continuous loop drive belt in a buffering apparatus to transport a plurality of stacks of documents along a path formed by the drive belt; and controlling aligner belt motors to rotate a plurality of aligner belts in the buffering apparatus at least partially independently relative to each other and the drive belt, wherein projections on the aligner belts are located against leading and trailing edges of each stack to keep the stacks substantially straight during transport by the drive belt.

BRIEF DESCRIPTION OF THE DRAWINGS

The foregoing aspects and other features of the invention are explained in the following description, taken in connection with the accompanying drawings, wherein.

DETAILED DESCRIPTION OF EMBODIMENTS

Figure 1:
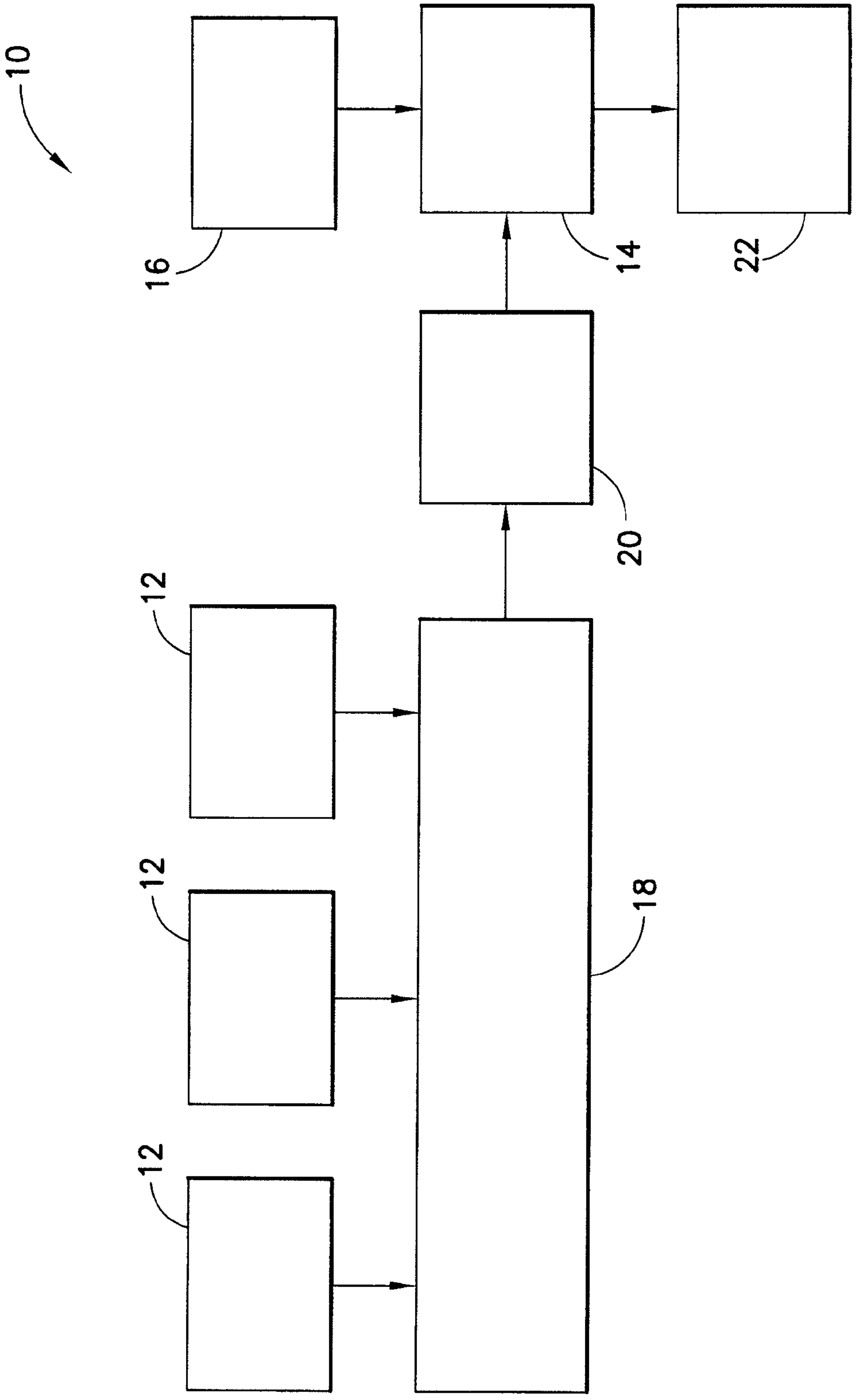
FIG. 1 is a diagram illustrating some components of an apparatus comprising features of the invention.

Referring to FIG. 1, there is shown a diagram illustrating a document handling apparatus 10 incorporating features of the invention. Although the invention will be described with reference to the example embodiments shown in the drawings, it should be understood that the invention can be embodied in many alternate forms of embodiments. In addition, any suitable size, shape or type of elements or materials could be used.

In this example embodiment the document handling apparatus 10 is an inserter adapted to insert mail pieces (e.g., documents) into envelopes. The inserter 10 generally comprises document supplies 12, an insertion station 14, an envelope supply 16, a transport system 18, a transport buffer apparatus 20, and an output 22. The document supplies 12 can each hold a supply (e.g., a stack) of different documents. The documents can be mail piece inserts or mail piece documents, for example. The transport system 18 is adapted to transport documents from the document supplies 12 towards the insertion station 14 for insertion into an envelope at the insertion station 14. In one embodiment the transport system 18 is adapted to assemble the documents from each of the document supplies 12 into a stacked assembly (e.g., collation).

The transport system 18 can be adapted to output the collations at a substantially constant speed (e.g., rate). However, the insertion station 14 operates at a second different rate. In particular, for the best throughput, the insertion station inserts the collation into an envelope at a higher rate due to the fact that an envelope at the insertion station is held stationary during the insertion process. Thus, the collations are inserted in a stepped fashion into the envelopes at the insertion station 14. After the collations are inserted into an envelope at the insertion station 14, the envelope is then sent to the output 22.

To accommodate the different rates of moving the collations between the transport system 18 and the insertion station 14, the apparatus 20 is provided. The apparatus 20 is a document transport buffering apparatus which changes the speed (i.e., rate) of movement of the stacks of documents from the first rate in the transport system 18 to the second different rate in the insertion station 14.

Figure 2:
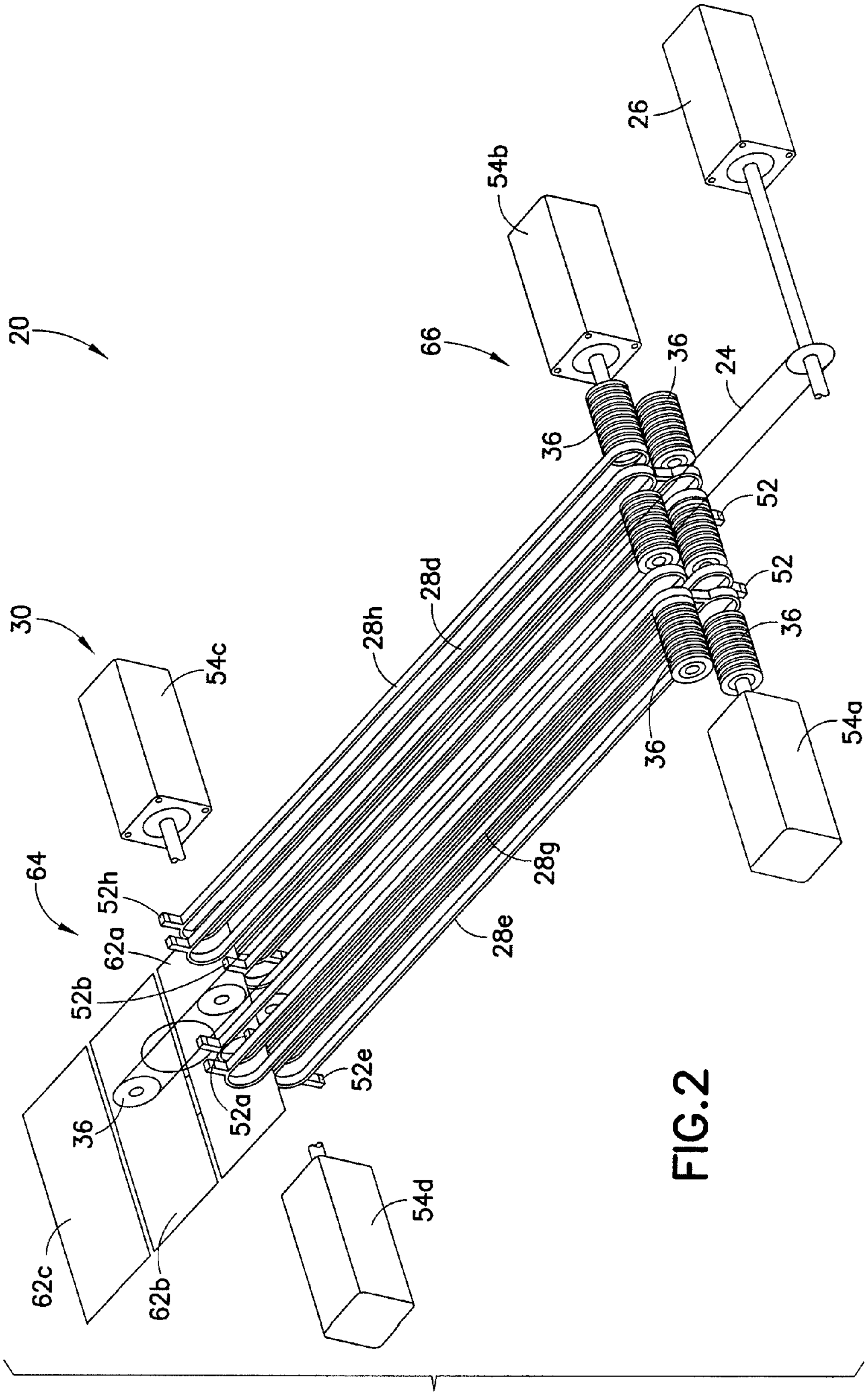
FIG. 2 is a partial perspective view of components of the buffer apparatus shown in FIG. 1 receiving a first stack of documents.
Figure 3:
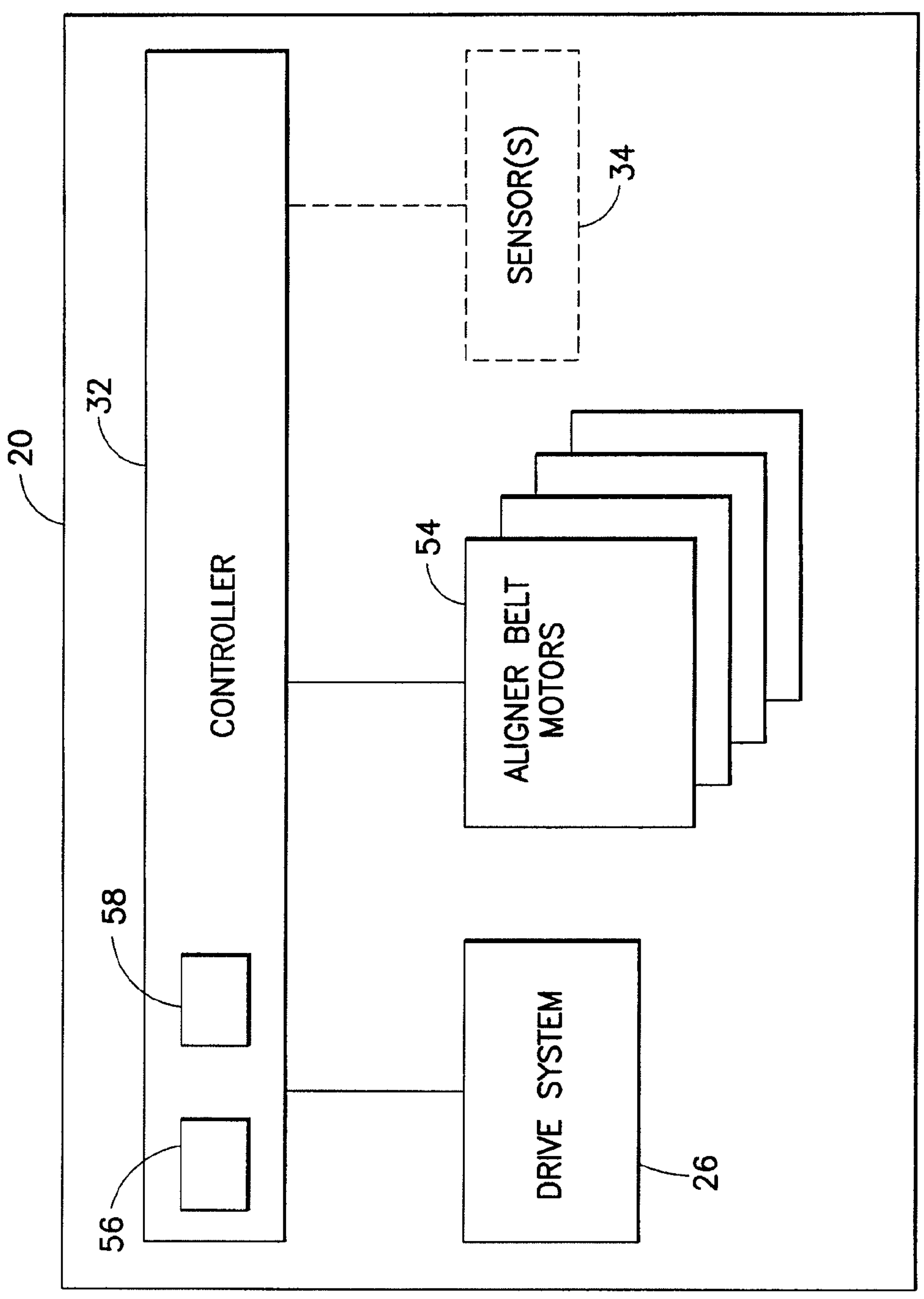
FIG. 3 is a block diagram of some components of the apparatus shown in FIG. 1.
Figure 4:
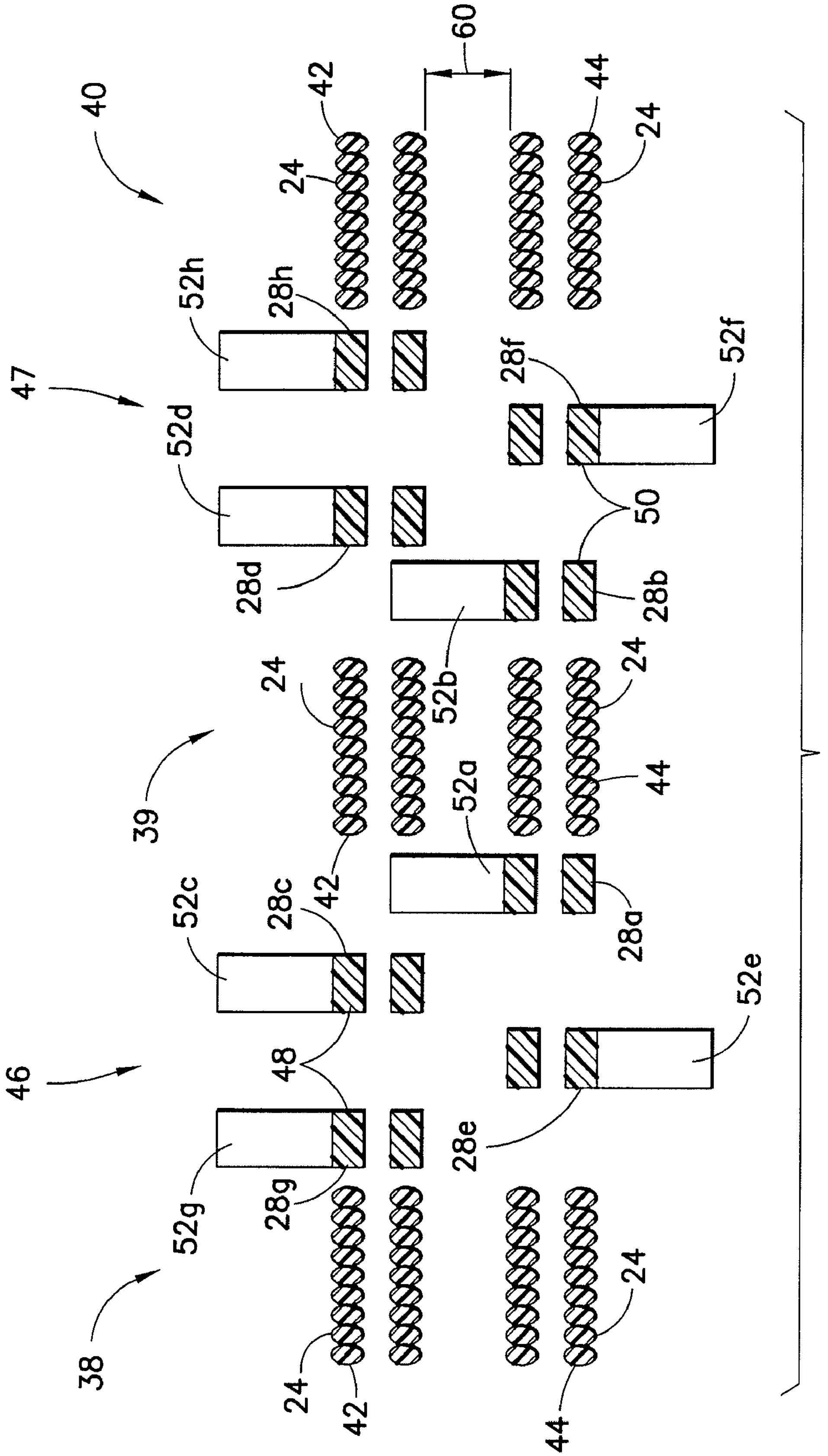
FIG. 4 is a partial schematic cross sectional view of the belt arrays shown in FIG. 2.

Referring also to FIGS. 2-4, the buffer 20 generally comprises an array of drive belts 24, a first drive system 26 adapted to rotate the drive belts 24, an array of aligner belts 28*a*-28*h* (collectively referred to as 28), a second drive system 30 adapted to rotate the aligner belts 28, and a controller 32. The apparatus 20 could also comprise one or more sensors 34 connected to the controller 32. Each of the drive belts 24 has a general continuous loop shape, such as an O-ring for example. Each of the aligner belts 28 also has a general continuous loop shape. The drive belts 24 are supported on rollers 36, only some of which are shown. In this example embodiment, the drive belts 24 are provided as three pairs 38, 39, 40 of top 42 and bottom 44 belts. The aligner belts 28 are provided as two pairs 46, 47 of top 48 and bottom 50 belts. Each pair 46, 47 has four of the aligner belts 28; two top and two bottom. In this example embodiment the aligner belts 28 are intermixed with the drive belts 24. Each aligner belt 28 comprises a respective projection 52*a*-52*h* (collectively referred to as 52) extending in a general cantilever fashion from the aligner belt. The top and bottom belts (except for the projections 52 as will be further described below) are generally spaced from each other by a gap 60. This gap 60 can be varied. The gap 60 forms the path for the stack of documents (collations) to travel through. In alternate embodiments any suitable number and arrangement of the belts 24, 28 could be provided.

The second drive system 30 is adapted to rotate at least some of the aligner belts 28 separately relative to each other. In this example embodiment the second drive system 30 comprises four motors 54*a*, 54*b*, 54*c*, 54*d* (collectively referred to as 54). The motors 54 are connected to the controller 32. The controller 32 comprises a memory 56 with software and a processor 58 which is configured to individually and at least partially separately drive the motors 54 to at least partially separately and individually rotate the aligner belts 28. The first motor 54*a* is connected to the aligner belts 28*a*, 28*b*. The second motor 54*b* is connected to the aligner belts 28*c*, 28*d*. The third motor 54*c* is connected to the aligner belts 28*e*, 28*f*. The fourth motor 54*d* is connected to the aligner belts 28*g*, 28*h*. The first and second drive systems 26, 30 are adapted to rotate the drive belts 24 and the aligner belts 28 such that a plurality of spaced stacks of documents 62*a*, 62*b*, 62*c* from the transport system 18 are transported by the drive belts with one of the projections 52 at a leading edge of each of the stacks and another one of the projections 52 at a trailing edge of each of the stacks.

The controller 32 can control operation of the motor 26 to move the stacks 62 from the input 64 to the output 66 of the buffer apparatus 20. The input 64 is located at the output from the transport system 18. The output 66 is located at the insertion station 14 where the stacks 62 are inserted into envelopes. As noted above, the rates of movement of the stacks into the input 64 from the transport system 18 and out the output 66 to the insertion station 14 are different. The buffer apparatus 20 accommodates these different rates to provide a maximum throughput of the apparatus 10.

FIGS. 2 and 4 show the apparatus 20 when a first stack 62*a* is being received at the input 64. When the stack 62*a* enters the apparatus 20 the first aligner belts 28*a*, 28*b* can be rotated by the first motor 54*a* to move their projection 52*a*, 52*b* in front of the first stack 62*a*. The projections 52*a*, 52*b*, thus, project into the gap 60 as shown in FIG. 4. The leading edge 68 (see FIG. 6) of the first stack 62*a* is pushed against the rear facing side of the projections 52*a*, 52*b*. Thus, the leading edge 68 can be kept straight and un-shingled.

Figure 5:
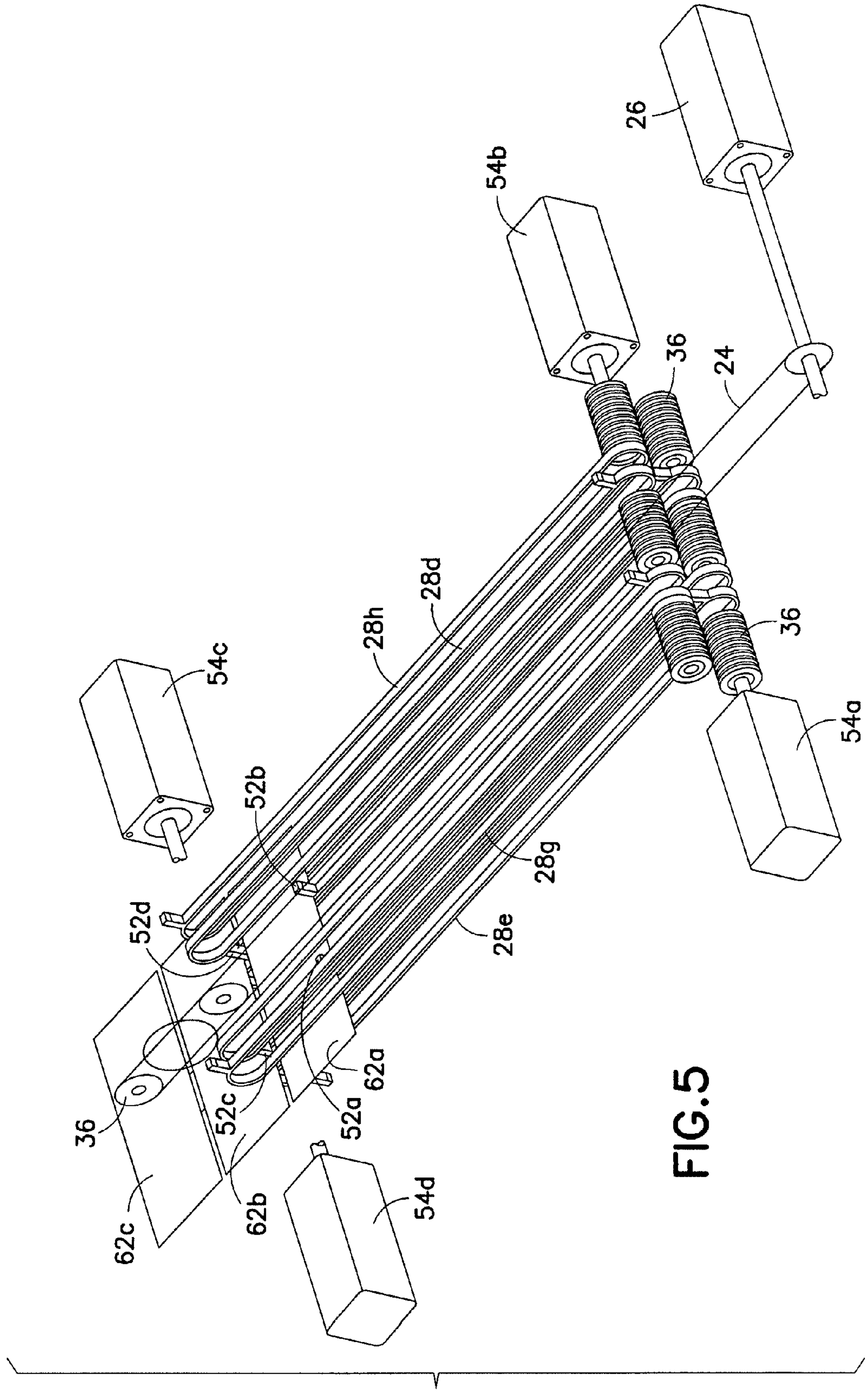
FIG. 5 is a partial perspective view of the components shown in FIG. 2 receiving a second stack of documents.
Figure 6:
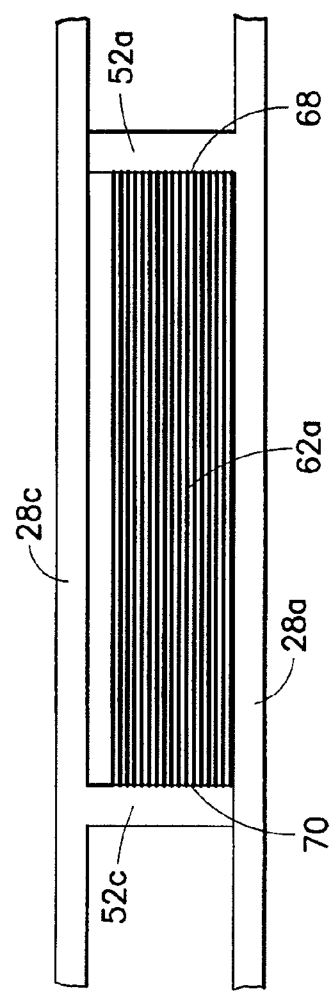
FIG. 6 is a side view of the first stack of documents shown in FIG. 5 in a pocket formed by top and bottom aligner belts shown in FIG. 5.
Figure 7:
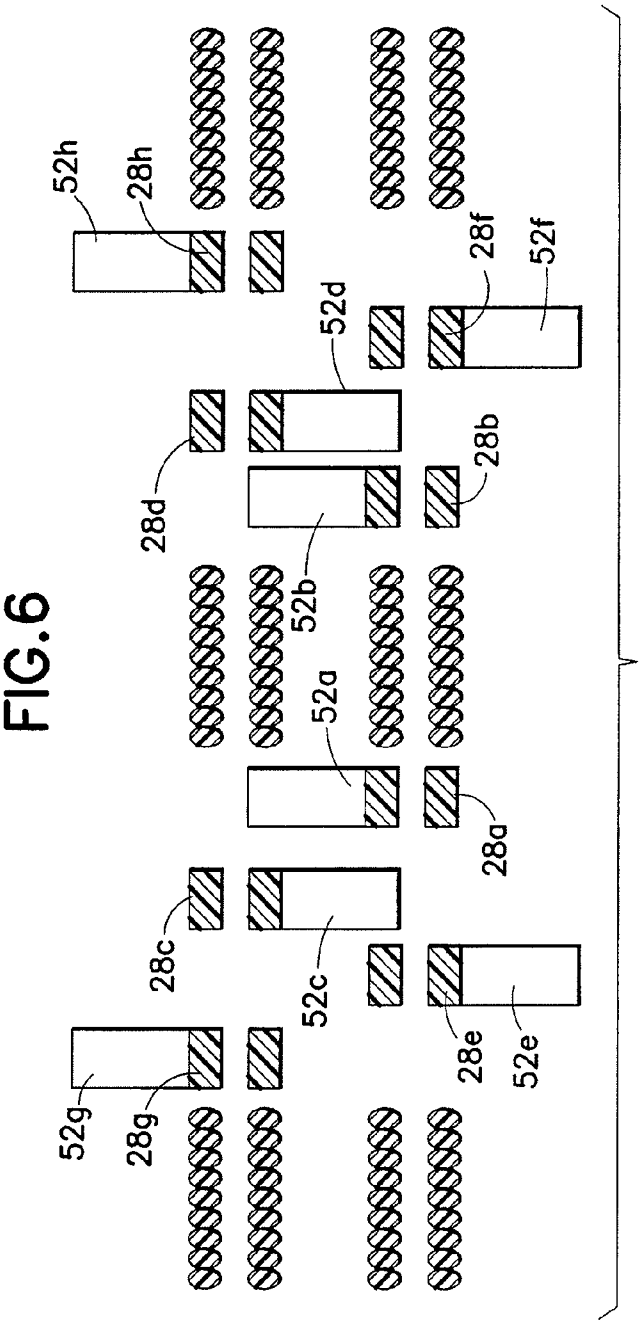
FIG. 7 is a partial schematic cross sectional view of the belt arrays shown in FIGS. 5 and 6.

Referring also to FIGS. 5-6, the drive belts 24 can urge the first stack 62*a* into the apparatus 20. The first aligner belts 28*a*, 28*b* can be rotated by their motor 54*a* to cause their projections 52*a*, 52*b* to travel forward allowing the first stack 62*a* to completely enter the apparatus 20. Referring also to FIG. 7, the second aligner belts 28*c*, 28*d* can then be rotated by the second motor 54*b* to move their projections 52*c*, 52*d* against the trailing edge 70 of the first stack 62*a*. Thus, the projections 52*c*, 52*d* of the second aligner belts 28*c*, 28*d* can move behind the first stack 62*a* to provide positive movement as the first stack 62*a* is conveyed through the apparatus 20. The first stack 62*a* can either move to the dump area (output 66) or hold to accept the second stack 62*b*. The apparatus 20 can have suitable means, such as the sensors 34 and software programming and/or inherent belt slippage for example to insure that the projections 52 stay against the leading and trailing edges of the stacks until the stacks reach the output 66.

The second projections 52*c*, 52*d* can act as a pusher for the first stack 62*a* and as a stop for the second stack 62*b*. The process is repeated with the first and second stacks 62*a*, 62*b* conveyed further in the machine. The aligner belts 28 create a pocket that does not allow shingling and will also allow for large collation sizes. In addition, the flat front and rear surfaces of the projections can square a "skewed" stack. This can be governed by the gap between the upper and lower drive belts 24.

Figure 8:
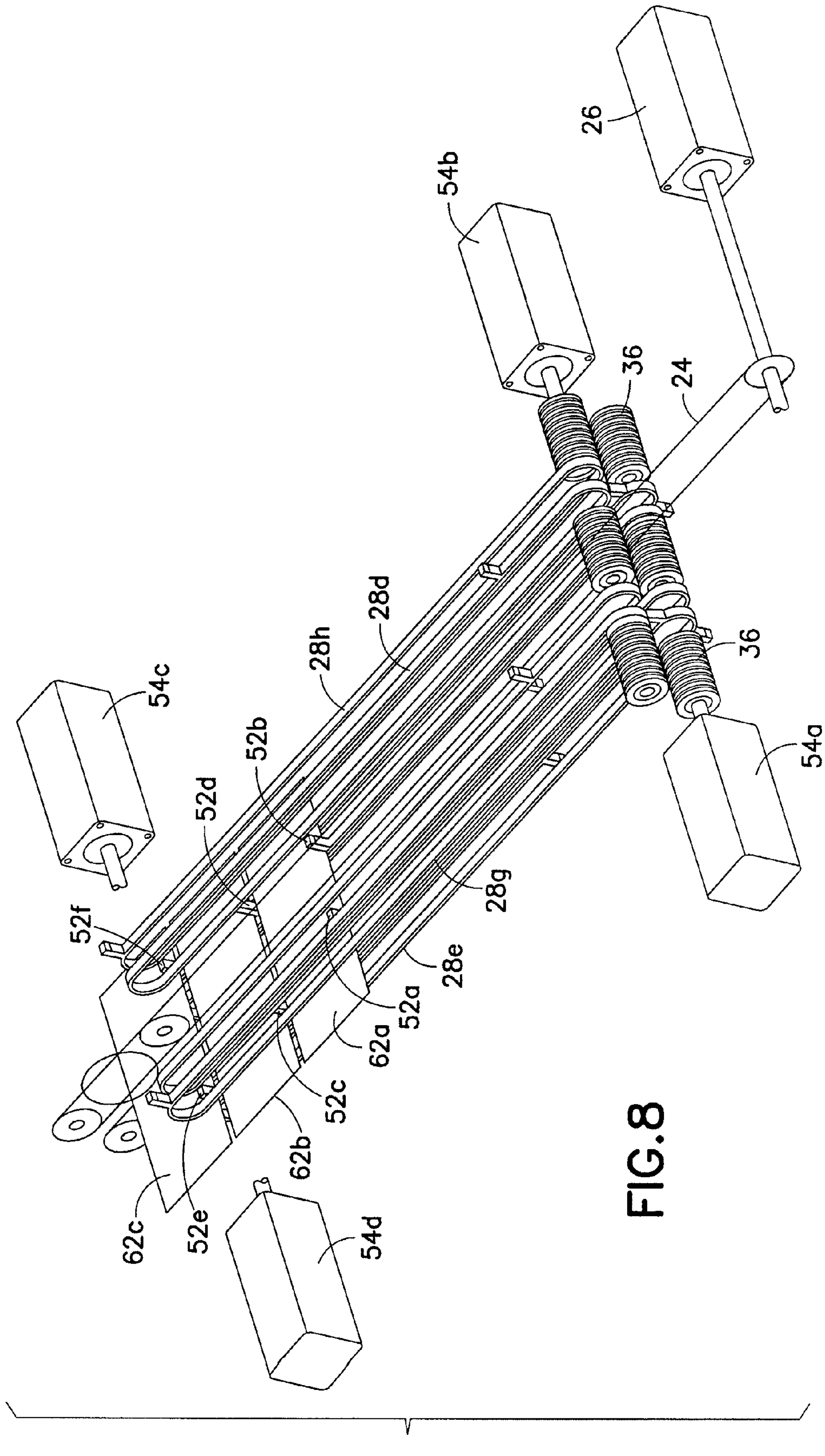
FIG. 8 is a partial perspective view of the components shown in FIG. 2 receiving a third stack of documents.
Figure 9:
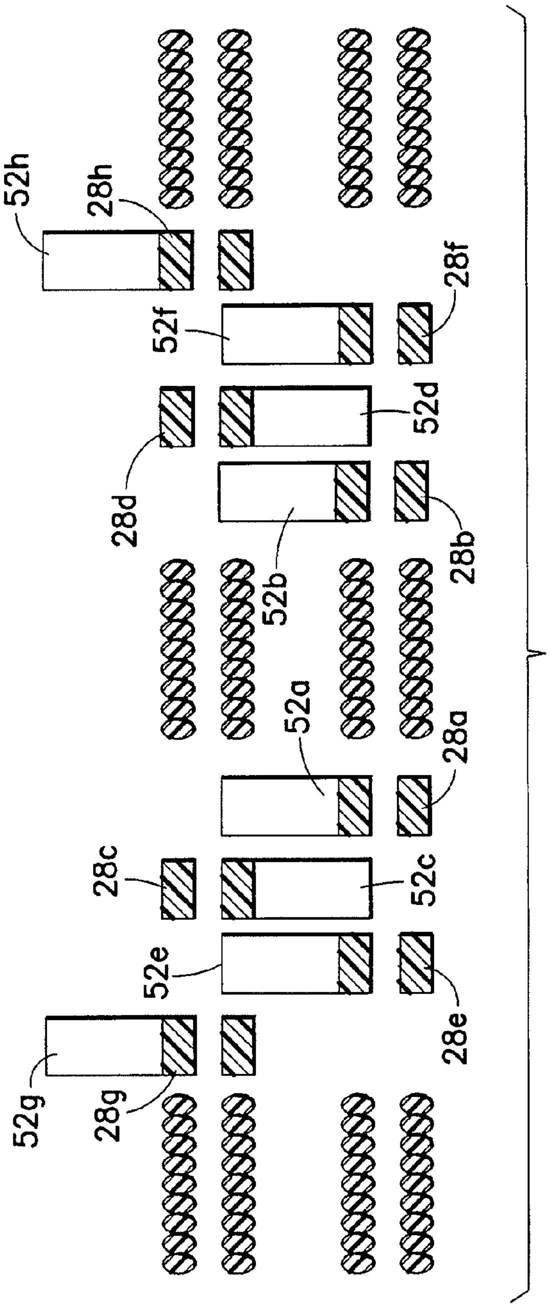
FIG. 9 is a partial schematic cross sectional view of the belt arrays shown in FIG. 9.
Figure 10:
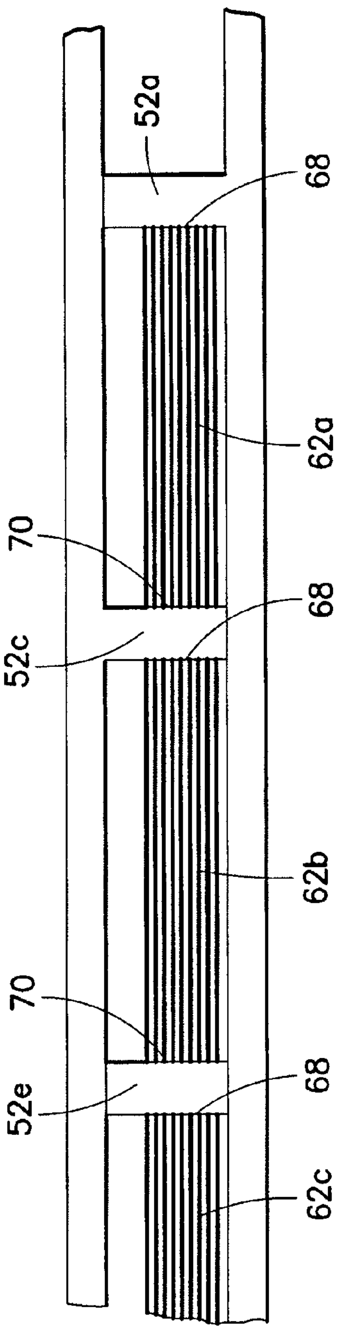
FIG. 10 is a side view of the stacks of documents shown in FIG. 8 in pockets formed by top and bottom aligner belts shown in FIG. 8.

Referring also to FIGS. 8-10, the drive belts 24 can urge the second stack 62*b* into the apparatus 20. The first and second aligner belts 28*a*, 28*b*, 28*c*, 28*d* can be rotated by their motors 54*a*, 54*b* to cause their projections 52*a*, 52*b*, 52*c*, 52*d* to travel forward allowing the second stack 62*b* to completely enter the apparatus 20. The third aligner belts 28*e*, 28*f* can then be rotated by the third motor 54*c* to move their projections 52*e*, 52*f* against the trailing edge 70 of the second stack 62*b*. Thus, the projections 52*e*, 52*f* of the third aligner belts 28*e*, 28*f* can move behind the second stack 62*b* to provide positive movement as the second stack 62*b* is conveyed through the apparatus 20. The third projections 52*e*, 52*f* can act as a pusher for the second stack 62*b* and as a stop for the third stack 62*c*.

Figure 11:
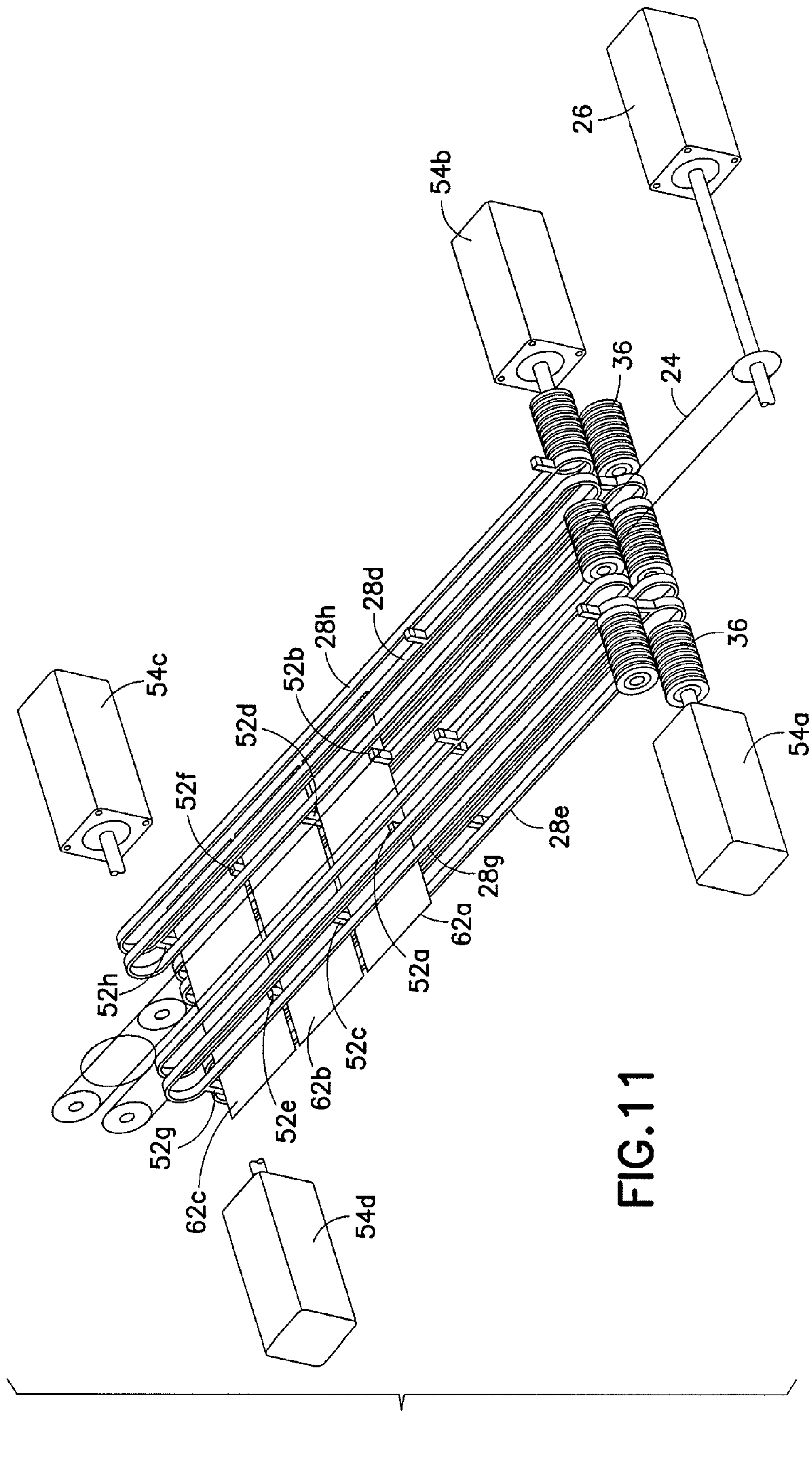
FIG. 11 is a partial perspective view of the components shown in FIG. 2 having fully received three stacks of documents.
Figure 12:
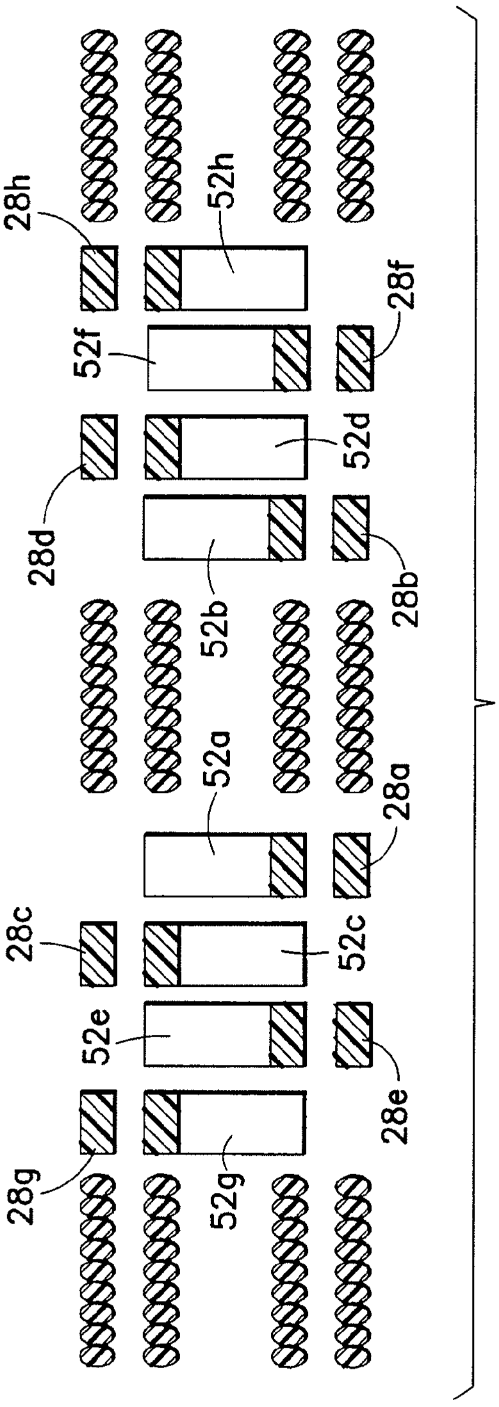
FIG. 12 is a partial schematic cross sectional view of the belt arrays shown in FIG. 11.
Figure 13:
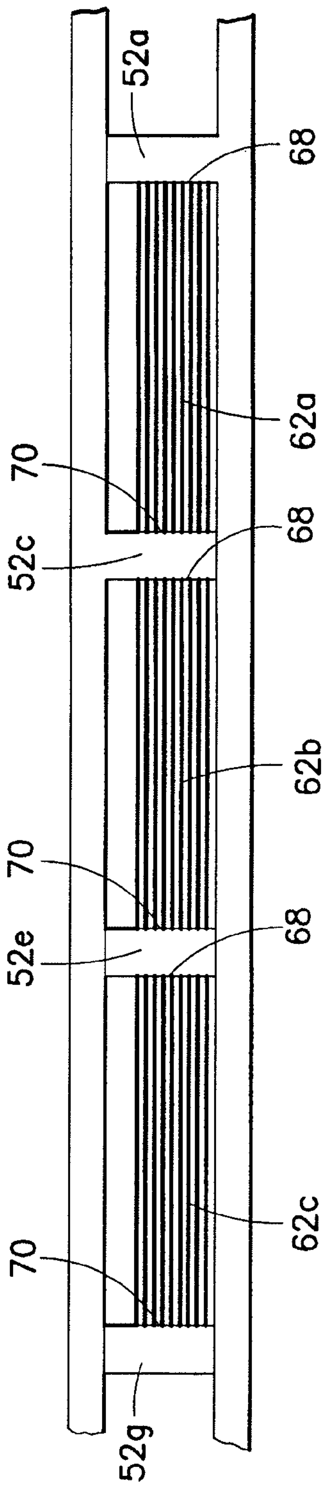
FIG. 13 is a side view of the stacks of documents shown in FIG. 11 in pockets formed by top and bottom aligner belts shown in FIG. 11.
Figure 14:
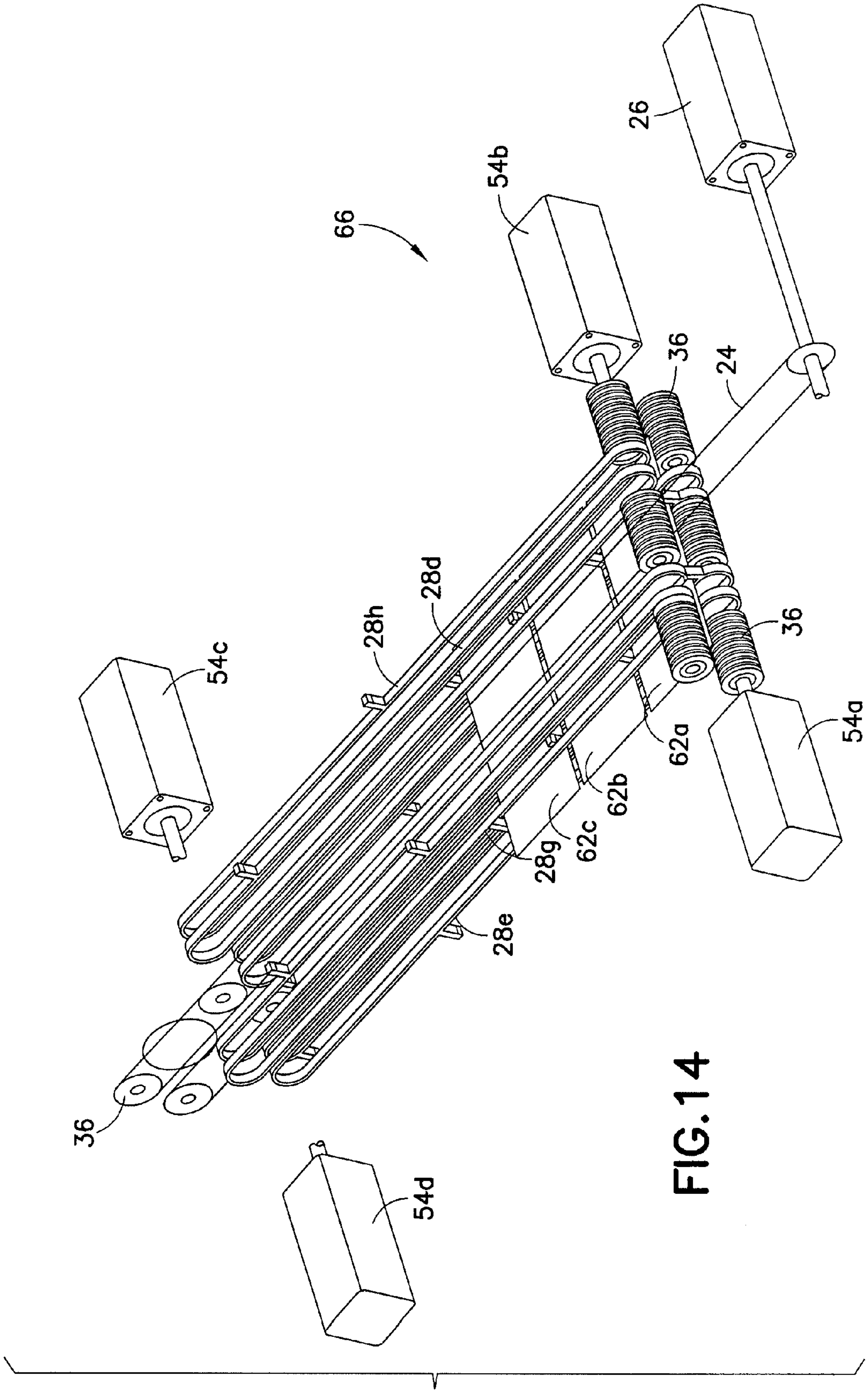
FIG. 14 is a partial perspective view of the components shown in FIG. 11 having moved the three stacks of documents to the output of the apparatus.

Referring also to FIGS. 11-13, the drive belts 24 can urge the third stack 62*c* into the apparatus 20. The first, second, and third aligner belts 28*a*, 28*b*, 28*c*, 28*d*, 28*e*, 28*f* can be rotated by their motors 54*a*, 54*b*, 54*c* to cause their projections 52*a*-52*f* to travel forward allowing the third stack 62*c* to completely enter the apparatus 20. The fourth aligner belts 28*g*, 28*h* can then be rotated by the fourth motor 54*d* to move their projections 52*g*, 52*h* against the trailing edge 70 of the third stack 62*c*. Thus, the projections 52*g*, 52*h* of the fourth aligner belts 28*g*, 28*h* can move behind the third stack 62*c* to provide positive movement as the third stack 62*c* is conveyed through the apparatus 20. The fourth projections 52*g*, 52*h* can act as a pusher for the third stack 62*c*. Referring also to FIG. 14, the apparatus 20 can transport the three stacks 62*a*, 62*b*, 62*c* to the output 66 for subsequent delivery to the insertion station 14. As seen in FIG. 14, the aligner belts 28 can each have two of the projections spaced equally on the belt for greater throughput. Alternatively, more than two projections could be provided on each belt.

The invention can provide a positive control buffer between a document input at a first rate and a document output at a second different rate. Instead of using nips to move the collations, four pusher belt sets can be embedded in an array of O-rings or flat belts. The axis driving the belts and pusher belts can be positioned ½ inch to 1 inch apart in order to provide the ability to move large collations, such as 100 pages, for example. Other sizes may also be used. When a collation enters this machine, the first pusher belt can move a pusher in front of the collation. The O-rings or flat belts can urge the first collation into the machine. The first pusher belt can travel forward allowing the first collation to completely enter the machine. A second pusher belt can move behind the first collation to provide positive movement as the collation is conveyed through the machine. The collation can either move to the dump area or hold to accept a second collation.

Figure 15:
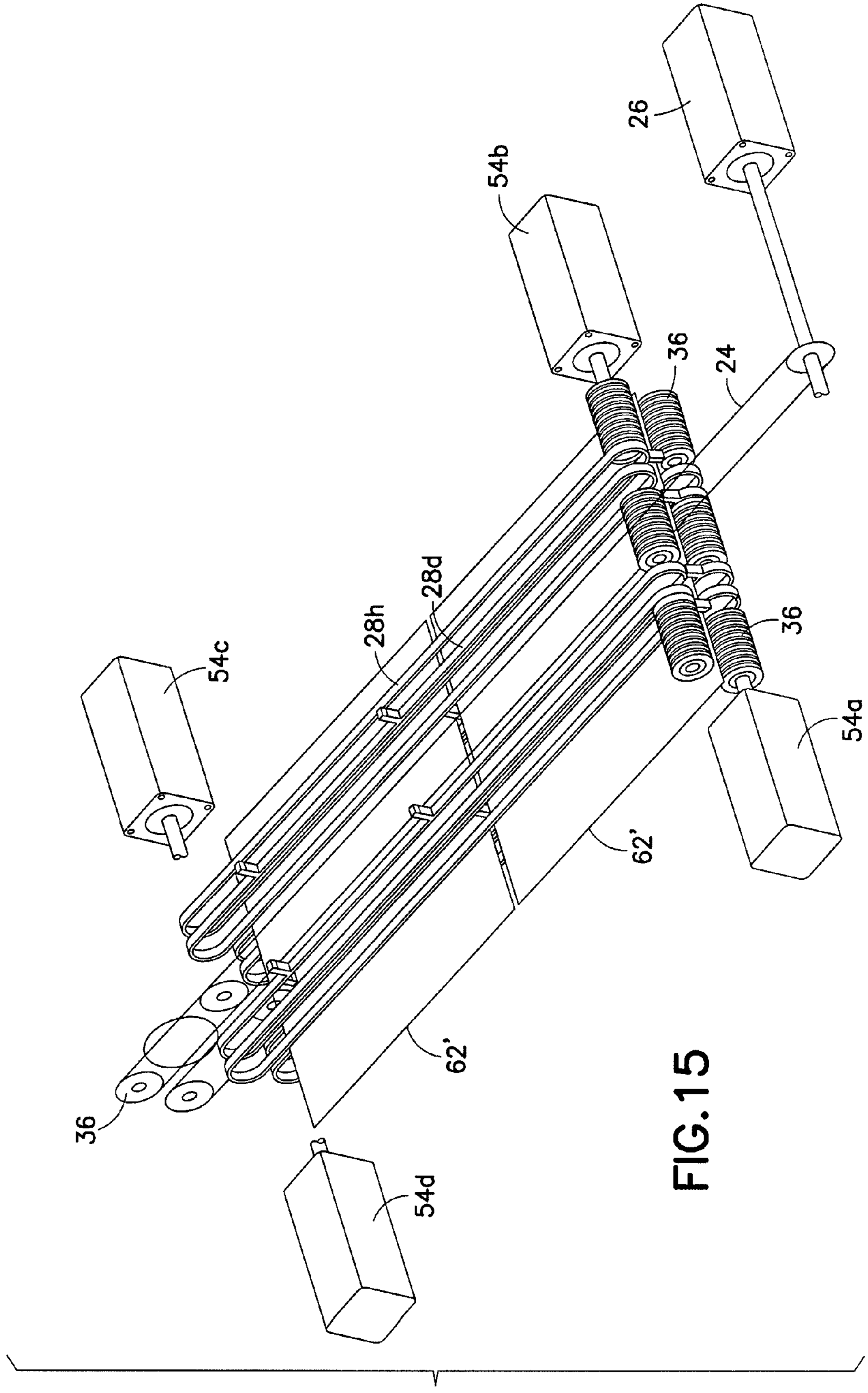
FIG. 15 is a partial perspective view of components of an alternate embodiment of the buffer apparatus shown in FIG. 2 having received two stacks of documents with larger dimensions than shown in FIG. 2.

The second pusher can act as a pusher for the first collation and a stop for the second collation. The process is repeated with the first and second collations conveyed further in the machine. The pusher belts create a pocket that does not allow shingling and will also allow for large collation sizes. In addition, the flat front and rear surfaces of the pusher can square a "skewed" collation. This can be governed by the gap between the upper and lower drives. When a third collation approaches, the process is repeated again. Once the third collation has entered the machine, the three collations can be conveyed to the dump area. The first collation can be pushed out with positive motion to ensure the collation is delivered square to the chassis. Once this collation has reached the deck at the output, the first pusher belt can be readied to accept the next collation. Embodiments of the invention can be used with a conventional stitcher. Referring also to FIG. 15, another embodiment is shown which has been configured to transport larger length documents 62'.

With one example of the invention, a document transport buffering apparatus 20 can be provided comprising an array of drive belts 24, wherein each of the drive belts has a general continuous loop shape; an array of aligner belts 28, wherein the aligner belts are intermixed with the drive belts, wherein each of the aligner belts 28 has a general continuous loop shape and a projection 52 extending in a general cantilever fashion from the aligner belt; a first drive system 26 adapted to rotate the drive belts 24; and a second drive system 30 adapted to rotate the aligner belts 28, wherein the second drive system is adapted to rotate at least some of the aligner belts separately relative to each other. The first and second drive systems 26, 30 are adapted to rotate the drive belts 24 and the aligner belts 28 such that a plurality of spaced stacks 62 of documents are transported by the drive belts with one of the projections 52 at a leading edge 68 of each of the stacks and another one of the projections 52 at a trailing edge 70 of each of the stacks.

The array of drive belts 24 forms a path 60 to transport the stacks 62 of documents, and the array of aligner belts 24 can comprise top ones 52*c*, 52*d*, 52*g*, 52*h* of the aligner belts located generally above the path 60 and bottom ones 52*a*, 52*b*, 52*e*, 52*f* of the aligner belts located generally below the path 60. The array of drive belts 24 can comprise top ones 42 of the drive belts at a top side of the path and bottom ones 44 of the drive belts at a bottom side of the path. The array of aligner belts 28 can comprises a left side group 46 of at least four of the aligner belts and a right side group 47 of at least four of the aligner belts, wherein each of the groups has two of the top aligner belts and two of the bottom aligner belts.

At least one of the aligner belts can comprise at least two of the projections 52 equally spaced from each other on the general continuous loop shape. Aligner belt motors 54 can be connected to the aligner belts, wherein the motors can be adapted to rotate at least some of the aligner belts at least partially independently relative to each other. A drive belt motor can be connected to the drive belts 24 to rotate the drive belts at a substantially continuous, constant velocity.

The document transport buffering apparatus 20 can be provided in an inserter 10 comprising an accumulator 12, 18 adapted to form stacks 62 of documents; an insertion station 14 adapted to insert the stacks of documents into envelopes; and the document transport buffering apparatus 20 located between the accumulator 12, 18 and the insertion station 14, wherein the document transport buffering apparatus 20 is adapted to transport the stacks of documents from the accumulator to the insertion station with a buffered time differential between receipt of the stacks from the accumulator and deliver of the stacks to the insertion station. The apparatus 20 can comprise a controller 32 configured to control rotation of the aligner belts to deliver of the stacks of documents to the insertion station at a stepped predetermined timing. The controller 32 could be the controller of the inserter 10.

The invention can comprise a method comprising transporting a first stack 62*a* of documents by a drive belt 24; locating a first projection 52*a* against a leading edge 68 of the first stack, wherein the first projection is located on a first aligner belt 28*a* adapted to rotate generally parallel to rotation of the drive belt; locating a second projection 52*c* against a trailing edge 70 of the first stack 62*a*, wherein the second projection is located on a second aligner belt 28*c* adapted to rotate generally parallel to rotation of the drive belt; and transporting a second stack of documents by the drive belt spaced from the first stack, wherein a leading edge 68 of the second stack 62*b* is located against the second projection 52*c*.

The drive belt 24 can comprise an array of drive belts forming a transport path 60 for the stacks, wherein the drive belts are located above and below the path, and wherein transporting the first stack of documents comprises the drive belts above and below the path contacting top and bottom sides of the stacks. Locating the first projection against the leading edge of the first stack can comprise rotating the first aligner belt at a different rate than the drive belts. Locating the second projection against the trailing edge of the first stack can comprise rotating the second aligner belt at least partially independently relative to the first aligner belt. The method can further comprise locating a third projection 52*e* against a trailing edge of the second stack 62*b*, wherein the third projection is located on a third aligner belt 28*e* adapted to rotate generally parallel to rotation of the drive belt. The method can further comprise transporting a third stack 62*c* of documents by the drive belt 24 along with the first and second stacks but spaced from each other, wherein a leading edge 68 of the third stack 62*c* is located against the third projection 52*e*. The method can further comprise locating a fourth projection 52*g* against a trailing edge 70 of the third stack 62*c*, wherein the fourth projection 52*g* is located on a fourth aligner belt 28*g* adapted to rotate generally parallel to rotation of the drive belt. The method can further comprise outputting the stacks from the path 60 formed by the drive belt at a stepped predetermined timing which is different from a timing of entry of the stacks into the path. Locating the first projection 52*a* against the leading edge 68 of the first stack 62*a* can comprise moving the first projection upward into the document transport path 60 formed by the drive belt, and wherein locating the second projection 52*c* against the trailing edge 70 of the first stack comprises moving the second projection downward into the document transport path 60. The method can further comprise varying timing of the locating of the second projection against the trailing edge of the first stack relative to the locating of the first projection against the leading edge of the first stack based, at least partially, upon a dimension of the stack. The varying of the timing can comprise sensing force of the second projection against the trailing edge of the first stack.

One example of the invention can comprise a method of manufacturing a buffering apparatus comprising providing an array of drive belts 24 adapted to transport a plurality of stacks 62 of documents; locating an array of aligner belts 28 intermixed with the array of drive belts to rotate generally parallel to each other, wherein each of the aligner belts comprise a projection 52 extending from the aligner belt in a general cantilever fashion; and connecting the aligner belts to a plurality of motors 54, wherein the motors 54 are adapted to independently rotate at least some of the aligner belts relative to each other and relative to the drive belts. The projections are located to project in an area against leading edges 68 and trailing edges 70 of the stacks 62 to keep the stacks substantially straight during transport by the drive belts 24. The method can further comprise connecting a controller 32 to the motors 54 such that the controller can control rotations of at least some of the aligner belts 28 separately relative to each other.

One example of the invention can comprise a program storage device 56 readable by a machine, tangibly embodying a program of instructions executable by the machine for performing operations comprising controlling a drive belt motor 26 to rotate a continuous loop drive belt 24 in a buffering apparatus 20 to transport a plurality of stacks 62 of documents along a path 60 formed by the drive belt; and controlling aligner belt motors 54 to rotate a plurality of aligner belts 28 in the buffering apparatus 20 at least partially independently relative to each other and the drive belt, wherein projections 52 on the aligner belts 28 are located against leading and trailing edges 68, 70 of each stack 62 to keep the stacks substantially straight during transport by the drive belt.

It should be understood that the foregoing description is only illustrative of the invention. Various alternatives and modifications can be devised by those skilled in the art without departing from the invention. For example, features recited in the various dependent claims could be combined with each other in any suitable combination(s). In addition, features from different embodiments described above could be selectively combined into a new embodiment. Accordingly, the invention is intended to embrace all such alternatives, modifications and variances which fall within the scope of the appended claims.

What is claimed is:

1. A document handling apparatus, comprising a document transport buffering apparatus, the document transport buffering apparatus comprising:

an array of drive belts, wherein each of the drive belts has a general continuous loop shape;

an array of aligner belts, wherein the aligner belts are intermixed with the drive belts, wherein each of the aligner belts has a general continuous loop shape and a projection extending in a general cantilever fashion from the aligner belt;

a first drive system adapted to rotate the drive belts; and a second drive system adapted to rotate the aligner belts, wherein the second drive system is adapted to rotate at least some of the aligner belts separately relative to each other, wherein the first and second drive systems are adapted to rotate the drive belts and the aligner belts such that a plurality of spaced stacks of documents are transported by the drive belts with one of the projections at a leading edge of each of the stacks and another one of the projections at a trailing edge of each of the stacks.

2. The apparatus of claim 1, wherein the array of drive belts form a path to transport the stacks of documents, and wherein the array of aligner belts comprise top ones of the aligner belts located generally above the path and bottom ones of the aligner belts located generally below the path.

3. The apparatus of claim 2, wherein the array of drive belts comprise top ones of the drive belts at a top side of the path and bottom ones of the drive belts at a bottom side of the path.

4. The apparatus of claim 2, wherein the array of aligner belts comprise a left side group of at least four of the aligner belts and a right side group of at least four of the aligner belts, wherein each of the groups has two of the top aligner belts and two of the bottom aligner belts.

5. The apparatus of claim 1, wherein at least one of the aligner belts comprises at least two of the projections equally spaced from each other on the general continuous loop shape.

6. The apparatus of claim 1, further comprising aligner belt motors connected to the aligner belts, wherein the motors are adapted to rotate at least some of the aligner belts at least partially independently relative to each other.

7. The apparatus of claim 6, further comprising a drive belt motor connected to the drive belts to rotate the drive belts at a substantially continuous, constant velocity.

8. The apparatus of claim 1, further comprising:

an accumulator adapted to form stacks of documents; and an insertion station adapted to insert the stacks of documents into envelopes, wherein the document transport buffering apparatus is located between the accumulator and the insertion station, and wherein the document transport buffering apparatus is adapted to transport the stacks of documents from the accumulator to the insertion station with a buffered time differential between receipt of the stacks from the accumulator and deliver of the stacks to the insertion station.

9. The apparatus of claim 8, further comprising a controller configured to control rotation of the aligner belts to deliver of the stacks of documents to the insertion station at a stepped predetermined timing.

10. A method comprising:

transporting a first stack of documents by a drive belt;

locating a first projection against a leading edge of the first stack, wherein the first projection is located on a first aligner belt adapted to rotate generally parallel to rotation of the drive belt;

locating a second projection against a trailing edge of the first stack, wherein the second projection is located on a second aligner belt adapted to rotate generally parallel to rotation of the drive belt; and transporting a second stack of documents by the drive belt spaced from the first stack, wherein a leading edge of the second stack is located against the second projection.

11. The method of claim 10, wherein the drive belt comprises an array of drive belts forming a transport path for the stacks, wherein the drive belts are located above and below the path, and wherein transporting the first stack of documents comprises the drive belts above and below the path contacting top and bottom sides of the stacks.

12. The method of claim 11, wherein locating the first projection against the leading edge of the first stack comprises rotating the first aligner belt at a different rate than the drive belts.

13. The method of claim 12, wherein the locating the second projection against the trailing edge of the first stack comprises rotating the second aligner belt at least partially independently relative to the first aligner belt.

14. The method of claim 10, further comprising locating a third projection against a trailing edge of the second stack, wherein the third projection is located on a third aligner belt adapted to rotate generally parallel to rotation of the drive belt.

15. The method of claim 14, further comprising transporting a third stack of documents by the drive belt along with the first and second stacks but spaced from each other, wherein a leading edge of the third stack is located against the third projection.

16. The method of claim 15, further comprising locating a fourth projection against a trailing edge of the third stack, wherein the fourth projection is located on a fourth aligner belt adapted to rotate generally parallel to rotation of the drive belt.

17. The method of claim 10, further comprising outputting the stacks from a path formed by the drive belt at a stepped predetermined timing which is different from a timing of entry of the stacks into the path.

18. The method of claim 10, wherein locating the first projection against the leading edge of the first stack comprises moving the first projection upward into a document transport path formed by the drive belt, and wherein locating the second projection against the trailing edge of the first stack comprises moving the second projection downward into the document transport path.

19. The method of claim 10, further comprising varying timing of the locating of the second projection against the trailing edge of the first stack relative to the locating of the first projection against the leading edge of the first stack based, at least partially, upon a dimension of the stack.

20. The method of claim 10, wherein varying timing comprises sensing force of the second projection against the trailing edge of the first stack.

* * * * *